UNITED STATES PATENT OFFICE 2,350,373

CHEMICAL PROCESS AND PRODUCT

Frank J. Soday, Swarthmore, Pa., assignor to The United Gas Improvement Company, a corporation of Pennsylvania No Drawing. Application September 9, 1941, Serial No. 410,173

3 Claims. (Cl. 260—652)

This invention pertains to the chlorination of isoprene.

More particularly, this invention pertains to the reaction of chlorine with isoprene to form chlorinated isoprene compounds.

It is an object of this invention to provide as new compositions of matter isoprene tetrachloride, by the chlorination of light oil isoprene fractions, under carefully controlled conditions. Another object of this invention is the provision of new chemical compounds having utility in a wide variety of chemical processes. Other objects of the invention will be apparent to those skilled in the art upon an inspection of the specification and claims.

Isoprene, or 2-methyl butadiene-1,3, is a conjugated diolefine possessing five carbon atoms.

Due to the presence of two double bonds in the isoprene molecule, the addition of 2 mols chlorine to one mol of isoprene in the absence of any substitution or decomposition reactions normally leads to the formation of isoprene tetrachloride.

The fully, direct chlorinated derivative of isoprene, namely isoprene tetrachloride, exists in more than one form due to the presence of asymmetric carbon atoms in the tetrachloride molecule.

Two types of isomerism may exist in chlorinated isoprene derivatives of the type described, namely, stereo or space isomerism and structural or chain isomerism.

Stereo isomerism is based upon the presence of asymmetrical carbon atoms, that is, carbon atoms to which are directly attached four dissimilar atoms or groups, in the molecule. Thus, for example, isoprene tetrachloride has two asymmetric carbon atoms, and therefore may exist in the form of four optical isomers, or two space isomers, representing racemic modifications. These may be represented graphically as follows:

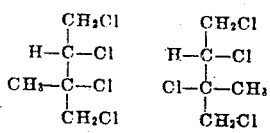

These isomeric isoprene tetrachlorides may be expected to possess dissimilar physical properties. Their chemical properties probably are identical, although their relative rates of reaction may differ to some extent. They would not be expected to show optical activity, as equivalent amounts of the $d$ and $l$ forms of each isomer should be formed in each case. While it is theoretically possible to effect a separation of the $d$ and $l$ forms by physical or chemical means, thus resulting in the possible formation of 4 isomeric isoprene tetrachlorides, such a separation would be very difficult to effect.

Structural or chain isomerism, in which two or more substituent atoms or groups are attached to one carbon atom, probably does not manifest itself to any great extent in the chlorination of isoprene until chlorinated products having more than four chlorine atoms present in the molecule are obtained. The major portion of the tetrachlorinated isoprene derivatives may be assumed to be compounds in which each of the substituent chlorine atoms are attached to different carbon atoms:

In the case of chlorinated isoprene derivatives containing more than four carbon atoms, however, structural isomerism will play an increasingly important role, very largely increasing the number of chlorinated derivatives obtained.

The chlorination of isoprene, therefore, is a very complex reaction and may lead to an almost infinitely large number of chlorinated derivatives. However, I have found that by a suitable choice of operating procedures to be more particularly described hereinafter, large yields of certain chlorinated derivatives, and of certain classes of chlorinated derivatives, may be obtained.

The chlorination of isoprene may be assumed to be initiated by the addition of one molecule of chlorine to one molecule of isoprene to form a dichloropentene. Four normal compounds theoretically may be formed in this manner, namely, the cis, and trans forms of 1,4-dichloro-2-methyl-butene-2

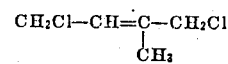

1,2-dichloro-2-methyl-butene-3,

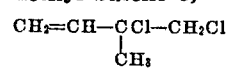

and 1,2 dichloro-3-methyl-butene-3

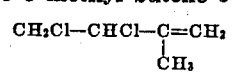

Stereo-isomers and structural isomers of these compounds also may be present in the chlorinated products.

The second stage of the chlorination may be assumed to be the addition of a second molecule of chlorine to one or more of the dichlorides shown to form isoprene tetrachlorides. As indicated previously these may exist in two stereo-isomeric forms.

If the chlorination of the dichlorides does not take place entirely by addition, and substitution products are formed, tetrachlorides possessing entirely different structures may be obtained. These latter products also may be present in the form of geometrical, structural, and/or stereo-isomers.

In addition, tetrachlorides also may be formed by the direct and simultaneous addition of two molecules of chlorine to the isoprene molecule. As this reaction mechanism involves the simultaneous collision of three molecules, it is apparent that isoprene tetrachlorides are formed mainly by the addition of one molecule of chlorine to an isoprene dichloride.

The chlorinated isoprene derivatives formed by the direct addition of two molecules of chlorine to the isoprene molecule, in the absence of substitution and/or decomposition reactions, namely, 1, 2, 3, 4-tetrachloro-2-methyl butane, may be regarded as the normal fully chlorinated isoprene derivatives. However, as will be more particularly pointed out hereinafter, such products may not constitute the major products obtained by the action of chlorine on isoprene. In fact, isoprene tetrachlorides may comprise the minor portion of the reaction products obtained.

The chlorinated products obtained by the action of two mols of chlorine on one mol of isoprene may contain, in addition to the isoprene tetrachlorides previously referred to, methyl trichlorobutenes, pentachloropentanes, hexachloropentanes, and similar products. In contrast to the isoprene tetrachlorides, these products are obtained as the result of (1) substitution, (2) substitution and addition, (3) substitution and decomposition, and/or (4) addition and decomposition reactions.

Methyl trichlorobutenes may be formed by the addition of a molecule of chlorine to methyl monochlorobutenes, or by the cleavage of HCl from one or more isoprene tetrachlorides. Consequently, the number of possible methyl trichlorobutenes which may be obtained by the addition of chlorine to isoprene is very large. In addition, these compounds also may exist in the form of geometrical, structural, or stereo-isomers.

Pentachloropentanes may be formed by the addition of a molecule of chlorine to the trichloropentanes described previously, or by the attachment of one atom of chlorine, by substitution reactions, to one of the isoprene tetrachlorides.

Hexachloropentanes, as well as more highly chlorinated derivatives, may be formed by substituting chlorine for certain of the hydrogen atoms present in the pentachloropentanes, or other less highly chlorinated isoprene derivatives. These compounds also may exist in the form of structural or space isomers.

In addition to the foregoing, isoprene tetrachlorides also may be obtained by substitution, or by substitution and addition reactions. However, it should be emphasized that the addition type of reaction, which has been discussed previously, normally accounts for the production of the major portion, if not all, of the isoprene tetrachlorides obtained.

The isoprene tetrachlorides formed as the result of substitution, or any combination of substitution, addition, and/or decomposition reactions, possess different structures from those obtained by the direct addition of chlorine to isoprene, and may exist in the form of space, structural or geometric isomers.

The foregoing discussion may be summarized by stating that the direct addition of two mols of chlorine to isoprene may result in the production of one or more normal isoprene tetrachlorides, while the reaction of two mols of chlorine with isoprene by (1) substitution, (2) substitution and addition, (3) substitution and decomposition, and/or (4) addition and decomposition reactions results in the production of a very large number of chlorinated isoprene derivatives containing from two to five, or more, chlorine atoms. These latter products also may be saturated in nature, or they may contain one or more double bonds.

I have found that the chlorination of isoprene may be carried out in such a way as to give excellent yields of isoprene tetrachlorides, by a suitable control of certain of the reaction variables, the most important of which are the (1) ratio of chlorine to isoprene, and (2) the method employed in contacting the reactants. In addition, the temperature, time of contact, concentration and degree of purity of the respective reactants, and the presence or absence of solvents and/or diluting agents, or mixtures thereof, also are important reaction variables.

Isoprene is a very reactive compound and may be readily polymerized to form a wide variety of synthetic rubber polymers. Consequently, great care must be exercised in the chlorinating process to eliminate all polymerizing influences, or to conduct the chlorination in such a way as to counteract or retard the effect of such polymerizing influences or conditions.

As hydrogen chloride is an excellent catalyst for the polymerization of isoprene, or chlorinated isoprene compounds containing one or more double bonds, it is important that the chlorination be carried out in such a way that the formation of this material, especially during the early stages of the process, is retarded or completely eliminated.

In the same way, the use of certain common chlorinating catalysts must be dispensed with, particularly in batch chlorinating operations, in order to insure reasonable yields of the desired chlorinated products by retarding the rate of polymerization of isoprene, or of certain unsaturated chlorinated isoprene derivatives. Thus, for example, ferric chloride and aluminum chloride are widely used as chlorinating catalysts for the chlorination of a wide variety of hydrocarbon, and other, materials. The use of either of these catalysts for the chlorination of isoprene in batch-type operations results in the polymerization of the greater portion or all of the isoprene present to form synthetic rubber type polymers, with a corresponding reduction in the yield of chlorinated compounds obtained.

The isolation and/or separation of the chlorinated products by fractional distillation methods also must be carried out with care due to the tendency of certain of the chlorinated unsaturated products present to polymerize upon the application of heat. In addition, the prolonged application of heat may result in the decomposition of a portion of the chlorinated products present to form unsaturated, or more highly unsaturated, chlorinated, or other, isoprene derivatives, with the simultaneous formation of hydrogen chloride. The hydrogen chloride liberated then serves as a catalyst, thus increasing the rate of polymerization of the unsaturated materials present.

It is desirable, therefore, to remove any excess chlorine and hydrogen chloride from the reaction products prior to distillation, particularly when the reaction has been carried out in such a way as to produce unsaturated products. This may be accomplished, among other ways, by washing the crude reaction product with an alkaline solution prior to distillation.

This may be summarized by stating that the chlorination of isoprene should be carried out in a minimum period of time, consistent with good yields, and that the fractionation of the chlorinated products also should be carried out in a minimum period of time. As the chlorinated isoprene products normally must be fractionated in an efficient column in order to separate the respective products to the desired extent, it is desirable that such operations be carried out under reduced pressures. In addition, certain inhibitors may be employed to reduce the rate of polymerization of the unsaturated chlorinated isoprene derivatives during the fractionation operations, and means may be taken to neutralize or absorb the hydrogen chloride formed during such operations.

Excellent results are obtained when light oil isoprene fractions, are chlorinated in moderate sized batches, or in a continuous system, and when the chlorinated isoprene derivatives are separated in a fractionating system containing only a moderate quantity of the chlorinated products, or when the chlorinated isoprene derivatives are separated in a continuous fractionating unit.

A desirable source of isoprene is the light oil obtained as a byproduct in the manufacture of carburetted water gas, coal gas, oil gas, and the like.

A particularly desirable source of the isoprene fractions to be used in processes of the type described herein is that obtained by the pyrolysis of petroleum, or petroleum hydrocarbons, in the presence of steam at temperatures above 1100° F. The isoprene obtained in this manner usually is in the form of a fraction possessing a fairly wide boiling range, and containing minor proportions of certain other diolefines, such as butadiene, piperylene, and/or cyclopentadiene. Such fractions may be used for the production of chlorinated isoprene derivatives of the type described herein, or narrower boiling fractions, containing lesser quantities of diolefines other than isoprene may be used for this purpose with excellent results.

A preferred embodiment of this invention is the use of light oil isoprene fractions derived from oil gas and containing up to 90% by weight of isoprene for the production of chlorinated isoprene derivatives. The use of isoprene fractions having a higher concentration of isoprene in the chlorination processes described herein usually results in a somewhat higher yield of polymers than when fractions containing lesser quantities of isoprene are employed, particularly when batch chlorinating processes in the absence of any solvent and/or diluting agent are employed.

As pointed out previously, the ratio of chlorine to isoprene employed in a given reaction profoundly affects the character of the products obtained. The reaction of two mols of chlorine with one mol of isoprene, particularly when the reaction is conducted in such a way that a slight excess of isoprene is present in the reaction zone at all times, results in the production of chlorinated isoprene derivatives containing relatively large proportions of isoprene tetrachlorides. The reaction of substantially more than two mols of chlorine with one mol of isoprene, on the other hand, results in the production of chlorinated products containing large proportions of products other than isoprene tetrachlorides.

The method of combining the reactants also has a considerable influence upon the nature of the chlorinated derivatives obtained. Thus, in the addition of two mols of chlorine to one mol of isoprene to form isoprene tetrachlorides, good yields are obtained if an excess of chlorine in the reaction zone for any appreciable period of time is avoided.

The chlorination of a light oil isoprene fraction, may be carried out in any desired batch or continuous system or unit, and either one or both of the reactants may be in the liquid or gaseous state, or in the form of a solution or dispersion in a suitable solvent, or mixture of solvents, and/or gases.

The time of contact is important from the standpoint of inhibiting secondary chlorinating and/or decomposition reactions. The contact time, however, may vary from a few seconds, or fractions of a second, in a continuous process to several hours in a batchwise process. When fairly long reaction times are used, suitable precautions should be observed in order to prevent, or retard the rate of, certain undesirable secondary reactions.

The temperature also may vary over fairly wide limits depending upon the concentration of the isoprene fraction employed, the presence or absence of solvents or diluents, the contact time, and the method of reaction employed. When chlorinating isoprene fractions in the liquid state, particularly when certain solvents or diluents are present, reaction temperatures ranging from −60 to 35° C. may be employed with excellent results. When the reaction is conducted in the gaseous state, particularly when certain solvents or diluents are present, reaction temperatures in the range of 35 to 150° C. may be employed.

In general, it may be said that satisfactory results are obtained when light oil isoprene fractions are chlorinated in the liquid state at temperatures below 35° C., and when light oil isoprene fractions are chlorinated in the gaseous state in a continuous manner at temperatures between 35 and 150° C. Temperatures other than those listed also may be employed with satisfactory results in certain cases if due precautions are taken to prevent or retard any undesirable secondary reactions.

As indicated previously, one or more of the reactants may be dissolved or dispersed in a suitable solvent or mixture of solvents and/or gases prior to or during the reaction. The use of solvents and/or gases as diluting agents tends to inhibit, or retard the rate of, certain undesirable secondary reactions, such as polymerizing or dehalogenating reactions. Examples of suitable solvents for isoprene fractions are other hydrocarbons or hydrocarbon fractions, preferably saturated in nature, and chlorinated hydrocarbons. Examples of suitable diluting agents for chlorine are inert gases, such as nitrogen and carbon dioxide.

The chlorination of light oil isoprene fractions may be carried out at atmospheric, sub-atmospheric, or super-atmospheric pressures.

The reaction of chlorine with isoprene fractions may be carried out with either one or both of the reactants in the liquid or gaseous state, in the form of a solution in a suitable solvent, or mixture of solvents, or dispersed in a gas or mixture of gases.

The reaction may be conducted in a continuous manner, such as by the simultaneous addition of the reactants to a suitable reaction vessel or zone maintained at the desired reaction temperature. The reaction unit if desired, may comprise a tube bundle or coil immersed in, or in contact with, a liquid bath maintained at the desired temperature level.

The process also may be carried out in a batchwise manner, such as by the addition of chlorine to a light oil isoprene fraction, or a solution thereof, in a reaction vessel or unit provided with temperature control means, or otherwise. Very satisfactory results may be obtained in this manner, particularly when the quantities involved are maintained within reasonable limits.

The reaction temperature may vary within fairly wide limits, provided that suitable precautions are observed to inhibit, or retard the rate of, undesired secondary reactions. When light oil isoprene fractions containing less than 90% isoprene are employed, or when the isoprene fraction is diluted with a suitable solvent, and the reaction is carried out in a batchwise manner, reaction temperatures in the range of −60 to 35° C. may be employed with excellent results. When the reaction is carried out in a continuous manner, temperatures ranging up to 150° C., or higher, may be employed with excellent results.

Isoprene tetrachlorides also may be prepared by the reaction of one mol of chlorine with one mol of an isoprene dichloride, or mixture of isoprene dichlorides, either before or after the said dichlorides have been isolated from the reaction mixture.

Isoprene displays a pronounced tendency to chlorinate by substitution, probably due to the presence of a tertiary carbon atom in the molecule.

I have found that satisfactory yields of isoprene tetrachloride may be obtained by removing the reaction products from the reaction zone as rapidly as possible. Otherwise, a portion of the isoprene tetrachlorides present may react further with the chlorine present to form isoprene pentachlorides and/or more highly chlorinated isoprene derivatives.

In addition, I have found that satisfactory yields of isoprene tetrachlorides may be obtained by conducting the reaction in such a way as to insure an excess of isoprene in the reaction zone at all times.

A combination of these two methods yields unusually satisfactory results.

The chlorination of isoprene fractions to form isoprene tetrachloride is illustrated by the following example.

Example 1

A 79.4% light oil isoprene fraction was placed in a suitable vessel and heated to a temperature slightly above room temperature, after which a stream of nitrogen was introduced into the unit under the surface of the isoprene fraction contained therein. The nitrogen-isoprene mixture was introduced into the bottom of a vertical reaction tube, comprising a bulb-shaped reflux condenser cooled with water. Chlorine was introduced continuously at the desired rate into the reaction tube at a point approximately two inches above the tube used for the entry of the nitrogen-isoprene mixture. The reaction products were removed from the reaction zone in the vapor state and immediately condensed and cooled.

A total of 186 grams of the light oil isoprene fraction was chlorinated during a period of three hours at a temperature of 135° C. A total of 508 grams of product having a density of 1.402 was obtained.

The reaction products were heated in a water bath under reduced pressure for three hours, resulting in the isolation of 467 grams of product having a density of 1.436.

The reaction products then were fractionated in a column possessing 23 theoretical plates, using a fairly high reflux ratio. The following results were obtained.

| Component: | Yield in per cent |
|---|---|
| Mixture of methyl trichlorobutenes and isoprene tetrachlorides | 26.1 |
| Isoprene tetrachloride | 23.7 |
| Isoprene pentachlorides | 30.8 |
| Isoprene pentachlorides and higher chlorinated derivatives | 19.4 |

The particular sample of isoprene tetrachloride obtained in this experiment had the following physical properties.

| | |
|---|---|
| Boiling point | 99.5° C. @ 8 mm. |
| Density ($d\ 20/4$) | 1.3878 |
| Refractive Index ($n^{20}$) | 1.5098 |
| Chlorine, found | 67.39, 67.36 |
| Chlorine, theory | 67.59 |
| Molar refraction, found | 45.21 |
| Molar refraction, theory | 44.76 |

Isoprene tetrachlorides may have densities ($d\ 20/4$) in the range of 1.360 to 1.470 and refractive indices ($n^{20}$) in the range of 1.5000 to 1.5150.

Example 2

A 189 gram portion of isoprene, in the form of the same fraction used in Example 1, was slowly introduced into a cylindrical glass reaction vessel containing chlorine dissolved in chloroform. An excess of chlorine was maintained in the reaction vessel throughout the reaction.

The isoprene fraction was chlorinated during a period of five hours at a temperature of 30° C. The reaction product was heated on a water bath under reduced pressure to remove all highly volatile materials.

The residue, amounting to 527 grams, then was fractionated in a column possessing an efficiency equivalent to 23 theoretical plates.

The following results were obtained

| Component: | Yield in per cent |
|---|---|
| Mixture of methyl trichlorobutenes and isoprene tetrachlorides | 16.1 |
| Mixture of isoprene tetrachlorides and isoprene pentachlorides | 22.2 |
| Isoprene pentachlorides | 40.0 |
| Isoprene hexachlorides | 19.4 |
| Isoprene hexachlorides and higher chlorinated derivatives | 2.1 |

It is to be understood that the foregoing specific examples are given by way of illustration only, and that changes, omissions, additions, substitutions and/or modifications might be made within the scope of the claims without departing from the spirit of the invention.

I claim:

1. A process for preparing 1,2,3,4-tetrachloro-2-methyl butane from a light oil isoprene fraction containing up to 90% by weight of isoprene and also containing other conjugated diolefine material of from 4 to 5 carbon atoms per molecule comprising chlorinating said fraction by the addition of approximately two mol equivalents of chlorine to approximately one mol equivalent of said isoprene.

2. In a process for preparing 1,2,3,4-tetrachloro-2-methyl butane from a light oil isoprene fraction containing up to 90% by weight of isoprene and also containing other conjugated diolefine material of from 4 to 5 carbon atoms per molecule in which said fraction is chlorinated by the addition of approximately two mol equivalents of chlorine to approximately one mol equivalent of said isoprene, the steps of contacting said light oil isoprene fraction with chlorine in the presence of an inert gas while maintaining the temperature in the reaction zone below 150° C., and removing the resulting reaction products from the reaction zone as formed.

3. In a process for preparing 1,2,3,4-tetrachloro-2-methyl butane from a light oil isoprene fraction containing up to 90% by weight of isoprene and also containing other conjugated diolefine material of from 4 to 5 carbon atoms per molecule in which said fraction is chlorinated by the addition of approximately two mol equivalents of chlorine to approximately one mol equivalent of said isoprene, the steps of contacting said light oil isoprene fraction at a temperature below 150° C. with chlorine in the presence of an inert gas while maintaining an excess of isoprene with respect to chlorine in the reaction zone, removing the resulting reaction products from the reaction zone as formed, neutralizing said reaction products by contact with an alkaline agent, and fractionally distilling said reaction products after neutralization to recover 1,2,3,4-tetrachloro-2-methyl butane.

FRANK J. SODAY.